(12) United States Patent
Kim et al.

(10) Patent No.: US 9,100,882 B2
(45) Date of Patent: Aug. 4, 2015

(54) HANDOVER FROM SERVING BASE STATION TO TARGET BASE STATION

(75) Inventors: Byeong Ki Kim, Anyang-si (KR); Yong Hoon Lim, Suwon-si (KR); Young Joo Lee, Suwon-si (KR)

(73) Assignee: LG-ERICSSON CO., LTD., Seoul (KR)

( * ) Notice: Subject to any disclaimer, the term of this patent is extended or adjusted under 35 U.S.C. 154(b) by 657 days.

(21) Appl. No.: 12/725,616

(22) Filed: Mar. 17, 2010

(65) Prior Publication Data

US 2011/0228743 A1 Sep. 22, 2011

(51) Int. Cl.
H04W 36/00 (2009.01)
H04W 36/08 (2009.01)

(52) U.S. Cl.
CPC .......... *H04W 36/0055* (2013.01); *H04W 36/08* (2013.01)

(58) Field of Classification Search
None
See application file for complete search history.

(56) References Cited

U.S. PATENT DOCUMENTS

| | | | |
|---|---|---|---|
| 2005/0250499 A1 | 11/2005 | Lee et al. | |
| 2009/0097451 A1 | 4/2009 | Gogic | 370/331 |
| 2009/0310568 A1 | 12/2009 | Chen et al. | 370/332 |
| 2010/0210268 A1* | 8/2010 | Lim et al. | 455/436 |
| 2011/0007712 A1* | 1/2011 | Lee | 370/332 |
| 2011/0190027 A1* | 8/2011 | Michel et al. | 455/522 |
| 2012/0087338 A1* | 4/2012 | Brandt et al. | 370/331 |

FOREIGN PATENT DOCUMENTS

KR 10-2006-00456928 5/2006

OTHER PUBLICATIONS

Chion, Mary; "2nd Draft HO SDD Text (HO AHG)"; IEEE 802.16 Broadband Wireless Access Working Group; Sep. 5, 2008; RL: http://wirelessman.org/tgm/contrib/C80/216m-08_1082.doc; pp. 1-10; (XP-002599808).
European Search Report dated Oct. 4, 2010 issued in Application No. 10 00 2822.
Chen, et al.; "A Cross-layer Fast Handover Scheme for Mobile WiMAX"; 1-4244-0264-6/07; 2007 IEEE; pp. 1578-1582.
Korean Office Action for Application No. 10-2008-0127649, dated May 25, 2013.

* cited by examiner

*Primary Examiner* — Jackie Zuniga Abad
(74) *Attorney, Agent, or Firm* — Ked & Associates, LLP

(57) ABSTRACT

Embodiments may relate to a method and system for performing a handover from a serving base station to a target base station. A signal for detecting a base station searching signal (BS-SS) may be transmitted from the base station to a user equipment. The target base station may receive a request for the signal for detecting the BS-SS and the signal for detecting the BS-SS may be transmitted from the serving base station to the target base station. The user equipment that had broadcasted the BS-SS to the plurality of base stations is identified, based on the receipt signal of the BS-SS. A handover may be performed from the serving base station to the target base station based on confirmation of the serving base station.

12 Claims, 4 Drawing Sheets

US 9,100,882 B2

HANDOVER FROM SERVING BASE STATION TO TARGET BASE STATION

TECHNICAL FIELD

The present invention generally relates to communication systems, and more particularly to a method and system for performing a handover from a serving base station to a target base station.

BACKGROUND

The 802.16 WiMAX technology is a next-generation wireless broadband communication technology providing wide-area outdoor services with more extended functions and coverage than Wi-Fi (802.11b/g), which is a wireless communication technology providing indoor services around a hot spot. While the coverage of Wi-Fi may be about 30 to 200 m and the transmission rate thereof may be no more than 4 to 11 Mbps, the coverage of WiMAX can be extended for up to 10 km and the available transmission rate thereof can be 40 Mbps. This offers a substantial technical advantage.

Conventionally, the WiMAX network includes a user equipment (UE) and a base station (BS). The UE is used for a subscriber to access the WiMAX network. The BS transmits control signals and data signals to the UE and receives control signals and data signals from the UE. A system management station in the WiMAX network transmits primary setting data to all the BSs in the WiMAX network. The primary setting data includes parameters for operating the BS. The BS stores the primary setting data and periodically broadcasts the same to the UEs in a service area of the BS. The primary setting data includes data related to a handover from one BS to another BS. The UE figures out handover information (HI) based on the primary setting data. The HI includes the timing of the handover and the target of the handover. The UE performs the handover based on the HI.

Conventionally, the UE performs the handover from one BS to another BS based on the HI. For this, the BS broadcasts the HI of all neighboring BSs to the UE. And the UE stores the HI of all the neighboring BSs.

The WiMAX network further includes a plurality of femto base stations in the service area of the macro base station. The plurality of femto base stations has a narrower service coverage area than that of the macro base station. Therefore, the WiMAX network with the plurality of femto base stations can resolve the cell tower traffic and guarantee good signal intensity in bad signal conditions. Though the service coverage of the femto base stations is narrow, the femto base stations operate in the same manner as the macro base station. Thus, not only are handovers among the macro base stations needed, but handovers between the macro base station and the femto base station are also needed.

When the method of performing handovers among the macro base stations is applied to the handover between the macro base station and the femto base station, it may be difficult to manage the data for the handover. In the service area of the macro base station, a plurality of femto base stations may be present. For applying the conventional method of the handover among the macro base stations to the handover between the macro base station and the femto base station, the macro base station may broadcast information for all the femto base stations in the service area as the primary setting data to the UE, and the UE may store the information for all the femto base stations. Thus, a data management load in the macro base station can be too heavy since the information for all the femto base stations in the service area of the macro base station should be managed and a huge amount of data for handover should be transmitted to the UE. Therefore, it may be impractical for the macro base station to manage and transmit the data for handover.

SUMMARY

An embodiment for handover between a femto base station and a macro base station is disclosed herein. In one embodiment, by way of non-limiting example, a communication system for handover includes: a serving base station configured to transmit a signal for detecting a base station searching signal (BS-SS) to a user equipment, wherein the user equipment receives the signal for detecting the BS-SS and broadcasts the BS-SS to a plurality of base stations, and a target base station configured to detect the BS-SS from the user equipment, wherein the target base station is one of the plurality of base stations, wherein the target base station is configured to transmit a receipt signal of the BS-SS to the serving base station and the serving base station is configured to perform a handover from the serving base station to the target base station.

The Summary is provided to introduce a selection of concepts in a simplified form that are further described below in the Detailed Description. This Summary is not intended to identify key or essential features of the claimed subject matter, nor is it intended to be used in determining the scope of the claimed subject matter.

DETAILED DESCRIPTION

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

Figure 1:
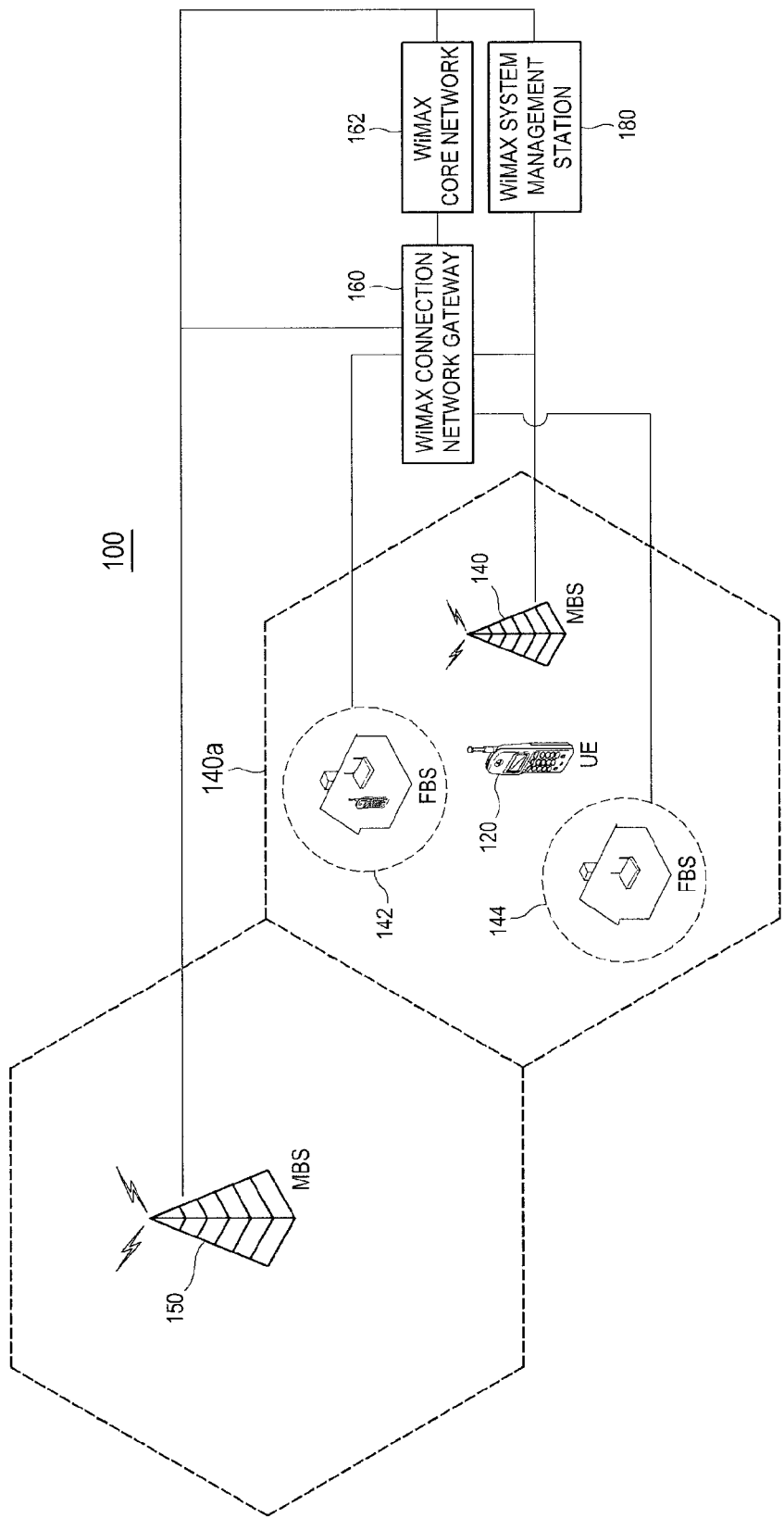
FIG. 1 is a schematic diagram showing an illustrative embodiment of a WiMAX network.

FIG. 1 is a schematic diagram showing an illustrative embodiment of a WiMAX network. The WiMAX network 100 may include user equipment (UE) 120, macro base stations (MBSs) 140 and 150 and femto base stations (FBSs) 142 and 144. MBS 140 may transmit and receive control signals and data signals to/from UE 120. MBS 140 may operate in a closed access mode with FBS 142 or in an open access mode with FBS 144. In the closed access mode, only registered UE 120 in the service area 140a of MBS 140 may be allowed to access FBS 142. In the open access mode, every UE 120 in the WiMAX network 100 may be allowed to access FBS 144. In FIG. 1, MBS 140 is coupled to one closed femto base station 142 and one open femto base station 144, but the number of each type of the femto base stations may vary.

WiMAX network 100 may further include WiMAX connection network gateway 160 and WiMAX core network 162. WiMAX connection network gateway 160 may be connected to MBSs 140 and 150 and FBSs 142 and 144 to control MBSs 140 and 150 and FBSs 142 and 144. The WiMAX connection network gateway 160 may interconnect with an upper network (not shown) and perform data packet routing. WiMAX core network 162 may be connected to WiMAX connection network gateway 160 and include servers (not shown) for authentication, charging, internet protocol address assignment and mobility management of client terminals such as UE 120.

WiMAX system management station 180 in WiMAX network 100, may be connected to the base stations, i.e., MBSs 140 and 150 and FBSs 142 and 144. In FIG. 1, WiMAX system management station 180 is connected to MBSs 140 and 150, but the number of MBSs 140 and 150 may be varied. In other words, WiMAX system management station 180 may be connected to a plurality of MBSs 140 and 150. WiMAX system management station 180 may be connected to FBSs 142 and 144 through WiMAX connection network gateway 160 or other hardware elements (nor shown). WiMAX system management station 180 may be connected to FBSs 142 and 144 directly.

WiMAX system management station 180 may transmit primary setting data to base stations 140, 142, 144 and 150. The primary setting data may include operating parameters of base stations 140, 142, 144 and 150 and handover data. The handover data, transmitted to the respective base stations, may include information on neighboring base stations of each base station. Thus, the primary setting data including the handover data may differ depending on base stations 140, 142, 144 and 150. The handover data may further include search information related to conditions and criteria for starting a search for neighboring base stations and handover execution information related to conditions and criteria for performing a handover from one serving base station of the base stations 140, 142, 144 and 150 to one target base station of the neighboring base stations. The information of neighboring base stations may include a list of neighboring base stations of respective base stations 140, 142, 144 and 150, and parameters of radio and physical layers. WiMAX system management station 180 may form the primary setting data and signal for detecting a base station searching signal (BS-SS), which is to be set by UE 120, in consideration of the types of base stations 140, 142, 144 and 150. The signal for detecting the BS-SS may differ according to characteristics of the signals, which is to be set as the BS-SS by UE 120. When a ranging signal, which is a standard of WiMAX, is used as the BS-SS, the signal for detecting the BS-SS may include cell information of a corresponding macro base station for detecting the ranging signal as recognition information. Furthermore, the signal for detecting the BS-SS may include information on a code range, a cycle, intensity, back off beginning and ending values of the ranging signal, a ranging region and the like.

Furthermore, WiMAX system management station 180 may transmit a signal for searching the neighboring base stations alone or together with primary setting data to at least one of the base stations 140, 142, 144 and 150. WiMAX system management station 180 may transmit the signal for detecting the BS-SS to MBSs 140 and 150 and may not transmit the signal for detecting the BS-SS to FBSs 142 and 144.

In one embodiment, MBS 140 may receive the primary setting data including the handover data. The primary setting data are used to set the operating parameters of MBS 140. In the case where an opened femto base station, such as FBS 144, is located in service area 140a of MBS 140, MBS 140 may get an identifier of open femto base station 144 within a database (not shown) of MBS 140 or by using the primary setting data transmitted from WiMAX system management station 180.

MBS 140 may broadcast the handover data to UE 120. In one embodiment, MBS 140 may broadcast the handover data about neighboring MBS 150 to UE 120. MBS 140 may not broadcast the handover data about FBSs 142 and 144 located in service area 140a or adjacent to MBS 140. In the case where open femto base station 144 is located in service area 140a, MBS 140 may transmit the identifier of open femto base station 144 to UE 120 for the purpose of notifying open femto base station 144.

MBS 140 may store the signal for detecting the BS-SS transmitted from WiMAX system management station 180. MBS 140 may receive a request signal for the signal for detecting the BS-SS from FBSs 142 and 144 and may transmit the signal for detecting the BS-SS to FBSs 142 and 144. In one embodiment, MBS 140 may broadcast the stored signal for detecting the BS-SS to UE 120.

FBSs 142 and 144 may perform the same operations of MBSs 140 and 150. FBSs 142 and 144 may set their own operating parameters based on the primary setting data transmitted from WiMAX system management station 180.

FBSs 142 and 144 may be configured to detect and receive the BS-SS, which is to be set by UE 120 and transmitted from UE 120. In one embodiment, FBSs 142 and 144 may be configured to detect the BS-SS based on the stored signal for detecting the BS-SS. FBSs 142 and 144 may request the signal for detecting the BS-SS to MBS 140 and store the signal for detecting the BS-SS transmitted from MBS 140. FBSs 142 and 144 may be configured to receive the primary setting data including the signal for detecting the BS-SS from WiMAX system management station 180 and store the same.

UE 120 may store the handover data of FBSs 142 and 144. In one embodiment, UE 120 may be configured to register the closed femto base station 142 among FBSs 142 and 144 as a home femto base station and store the handover data of the home femto base station. The registration of the home femto base station may be performed by UE 120 or a service provider (not shown). Also, the registration of the home femto base station may be performed by using a message transmitted from the closed femto base station 142. The registered home femto base station information in UE 120 may include the identifier of the home femto base station, an operation frequency and the handover data of the home femto base station. The handover data may include information of physical layer, location information of the home femto base station and the identifier of MBS 140 connected in communication with the home femto base station. In one embodiment, UE 120 may measure a location of the home femto base station by using a location measurement apparatus (not shown) within UE 120 to form the location information of the home femto base station.

UE 120 may store the handover data of the open femto base station 144 connected thereto. UE 120 may receive and store the handover data broadcasted from MBS 140 and get information of neighboring MBS 150. UE 120 may receive and store the signal for detecting the BS-SS broadcasted from the MBS 140. When UE 120 receives an identifier of open femto base station 144 transmitted from MBS 140, UE 120 may recognize that open femto base station 144 is in service area 140a of MBS 140.

UE 120 may set and transmit the BS-SS based on a signal for searching FBSs 142 or 144. At UE 120, a ranging signal of the WiMAX standard or another ranging signal defined by the user that is different from the WiMAX standard may be set as the BS-SS.

UE 120 may select a time for searching for a target base station such as FBSs 142 or 144 and transmit the BS-SS to a plurality of base stations 142 and 144 within a network at the selected time. For open femto base station 144, if the identifier of open femto base station 144 is included in the information of neighboring base stations transmitted from MBS 140, then UE 120 may be configured to select a time for searching for open femto base station 144. For closed femto base station 142, if the identifier of closed femto base station 142 is included in the information of neighboring base stations transmitted from MBS 140, then UE 120 may be configured to select a time for searching for closed femto base station 142. If UE 120 includes the location measurement apparatus (not shown) and stores the location information of the closed femto base station 142, then UE 120 may be configured to select the time for searching for closed femto base station 142, when UE 120 is in the service area of closed femto base station 142 by comparing the location of closed femto base station 142 measured by the location measurement apparatus with the location information of closed femto base station 142.

Figure 2:
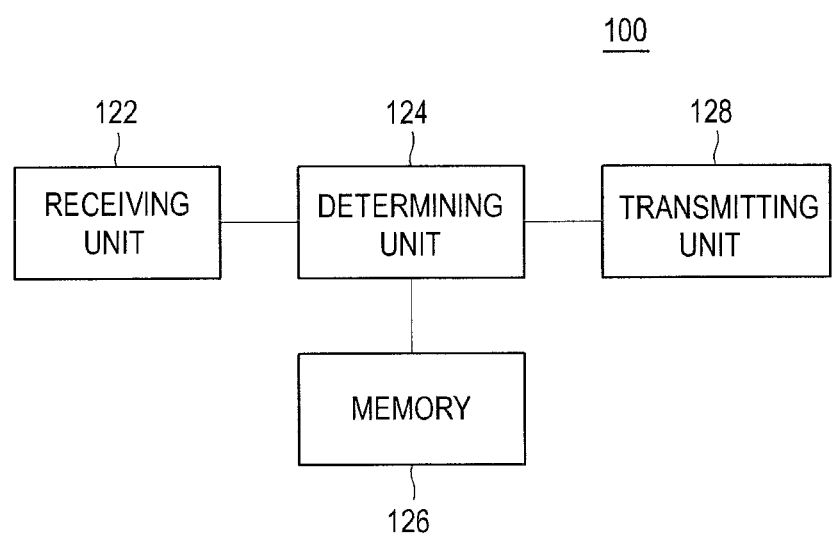
FIG. 2 is a schematic diagram showing an illustrative embodiment of a UE.

FIG. 2 is a schematic diagram showing an illustrative embodiment of the UE 120. UE 120 may include a receiving unit 122, a determining unit 124, a memory 126 and a transmitting unit 128. The receiving unit 122 may receive the signal for detecting the BS-SS and identifiers of the FBSs 142 and 144 in service area 140*a* of MBS 140. The determining unit 124 may select the time for transmitting the BS-SS based on the signal for detecting the BS-SS. In one embodiment, if the determining unit 124 receives the identifier of femto base station 142 or 144, then the determining unit 124 may select the time for transmitting the BS-SS. The memory 126 may store the signal for detecting the BS-SS. The transmitting unit 128 may broadcast the BS-SS to a plurality of base stations 142 and 144 at the selected time and the ranging signal periodically as the BS-SS.

Figure 3:
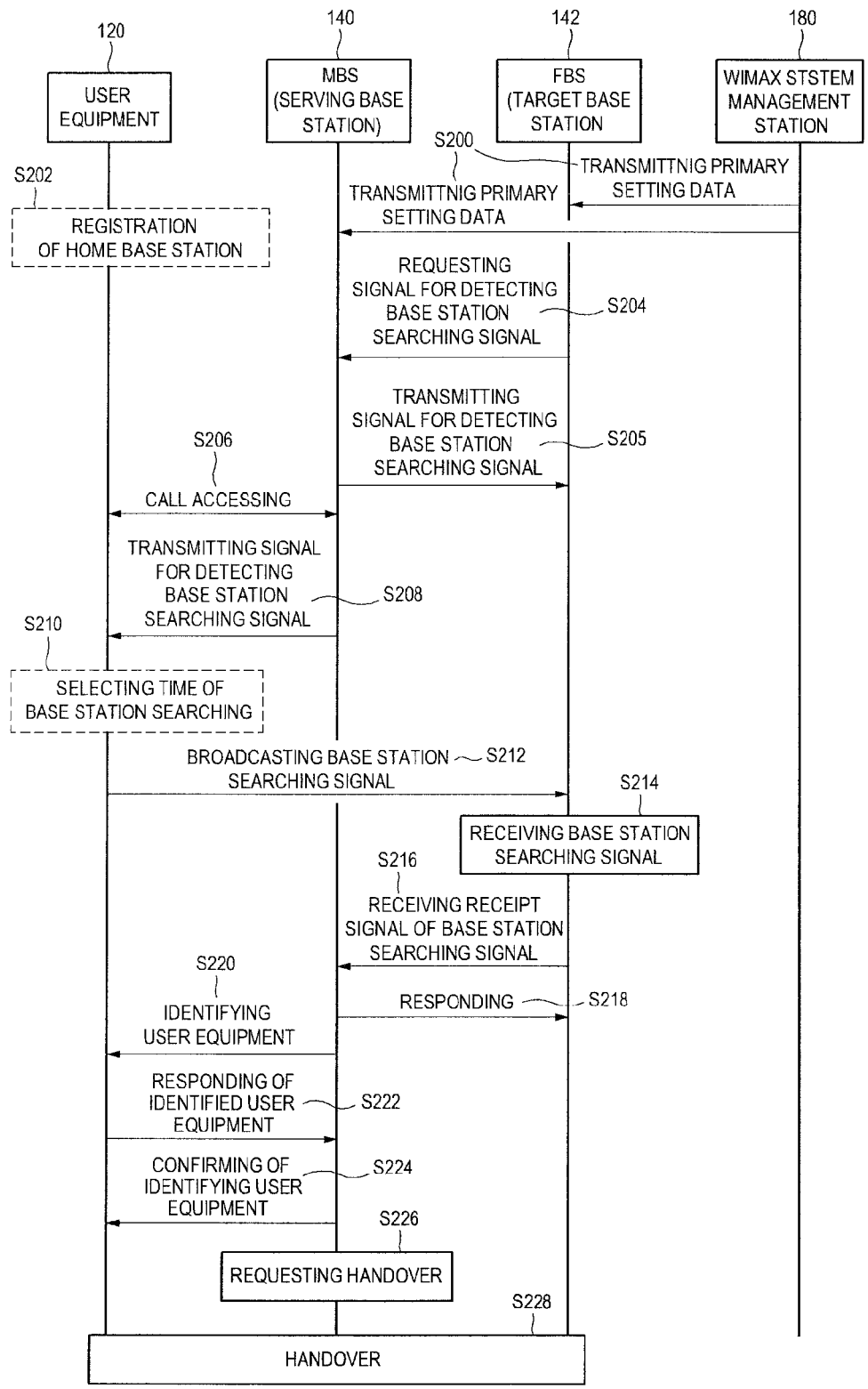
FIG. 3 is a call flow showing an illustrative embodiment of a handover in a WiMAX network including a femto base station operating in a closed access mode.

In an embodiment illustrated referring to FIG. 3, UE 120 may perform a handover from MBS 140 to FBS 142. MBS 140 may be a serving base station and FBS 142 may be a target base station. Referring to FIG. 3, FBS 142 may operate in a closed access mode in a WiMAX network. WiMAX system management station 180 may transmit the primary setting data to MBS 140 and FBS 142 (S200). MBS 140 and FBS 142 may set the operating parameters required for MBS 140 and FBS 142 based on primary setting data. The primary setting data transmitted to MBS 140 may include handover data of neighboring MBS 150 and may not include handover data of FBS 142.

UE 120 may register closed femto base station 142 as the home femto base station, that is, UE 120 may register the information regarding closed femto base station 142 as the home femto base station information (S202). The home femto base station information may include the identifier of the home femto base station, i.e., FBS 142, the operation frequency and handover data. The handover data may include information on the physical layer and location information of the home femto base station.

FBS 142 may request the signal for detecting the BS-SS (S204) to MBS 140, and then MBS 140 may transmit the signal for detecting the BS-SS (S205) to FBS 142. The signal for detecting the BS-SS may be transmitted from WiMAX system management station 180 with the primary setting data. In this case, steps S204 and S205 for requesting and transmitting the signal for detecting the BS-SS may be omitted.

UE 120 may request a call access from MBS 140 (S206). MBS 140 may transmit the signal for detecting the BS-SS (S208) to UE 120. Furthermore, MBS 140 may transmit the handover data related to neighboring MBS 150 to UE 120, independently or together with the signal for detecting the BS-SS. Furthermore, MBS 140 may broadcast the identifier of closed femto base station 142 to UE 120 in service area 140*a*.

UE 120 may select the time for searching FBS 142 (S210) and broadcast the BS-SS to a plurality of base stations 142 and 144 within a network at the selected time (S212). If UE 120 is located near the home femto base station by comparing the home femto base station information with the data transmitted from MBS 140, then UE 120 may be configured to broadcast the BS-SS. Alternatively, if UE 120 is in a service area of the home femto base station by comparing the location of UE 120 measured by the location measurement apparatus (not shown) with the home femto base station information, then UE 120 may be configured to broadcast the BS-SS.

FBS 142 may detect the BS-SS periodically. When FBS 142 receives the BS-SS (S214), FBS 142 may transmit a receipt signal indicating that FBS 142 received the BS-SS and that MBS 140 may receive the receipt signal of BS-SS (S216). FBS 142 may calculate the location of UE 120 based on the intensity of the BS-SS and determine whether FBS 142 may transmit the receipt signal of the BS-SS to MBS 140 based on the location of UE 120. FBS 142 may transmit the signal for detecting the BS-SS to MBS 140 to confirm that UE 120 transmitted the BS-SS. When the ranging signal is used as the BS-SS, FBS 142 may transmit the BS-SS to MBS 140. The BS-SS may include the identifier of FBS 142, information of the ranging signal, and the intensity of the ranging signal.

If MBS 140 receives the receipt signal of BS-SS from FBS 142, MBS 140 may respond to FBS 142 (S218). MBS 140 may detect UE 120, which had transmitted the BS-SS (S220-S224). If the ranging signal is used as the BS-SS, MBS 140 may transmit a signal for identifying UE 120, which had transmitted the BS-SS (S220). When identified UE 120, which receives the signal for identifying UE 120, responds to MBS 140 (S222), MBS 140 may transmit a signal for confirming of identifying UE 120 (S224). When the identifier of UE 120 is broadcasted to MBS 140 with the BS-SS, MBS 140 need not transmit the signal for identifying UE 120. MBS 140 may request FBS 142 to start performing the handover (S226), and then the handover is performed from MBS 140 to FBS 142 (S228).

Figure 4:
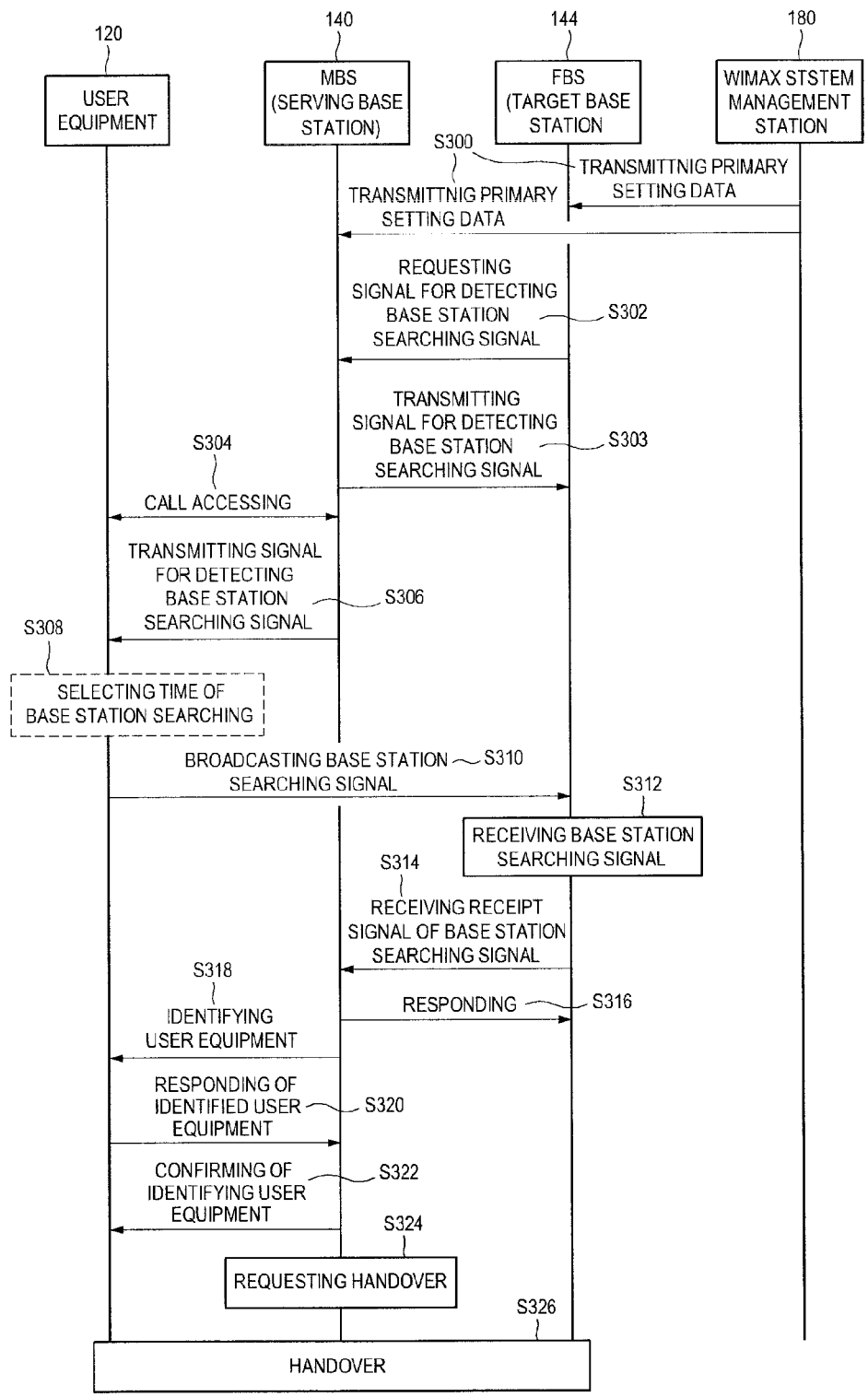
FIG. 4 is a call flow showing an illustrative embodiment of a handover in a WiMAX network including a femto base station operating in an open access mode.

In an embodiment illustrated referring to FIG. 4, UE 120 may handover from MBS 140 to FBS 144. MBS 140 may be a serving base station, and FBS 144 may be a target base station. Referring to FIG. 4, FBS 144 may operate in open access mode in the WiMAX network. WiMAX system management station 180 may transmit the primary setting data to MBS 140 and FBS 144 (S300). MBS 140 and FBS 144 may set the operating parameters based on the primary setting data. In one embodiment, the primary setting data may include the handover data of the neighboring macro base station such as MBS 150 and may not include the handover data of an open femto base station like FBS 144.

FBS 144 may request the signal for detecting the BS-SS to MBS 140 (S302). In response to the request, MBS 140 may transmit the signal for detecting the BS-SS (S303) to FBS 144. The signal for detecting the BS-SS may be transmitted from WiMAX system management station 180 with the primary setting data. In this case, steps S302 and S303 for requesting and transmitting the signal for detecting the BS-SS, may be omitted.

UE 120 may call access to MBS (S304). Then, MBS 140 may transmit the signal for detecting the BS-SS (S306) to UE 120. MBS 140 may transmit the handover data related to neighboring MBS 150 to UE 120, independently or together with the signal for detecting the BS-SS. Furthermore, MBS 140 may broadcast the identifier of open femto base station 144 to UE 120 in service area 140*a*.

UE 120 may select a time for searching for FBS 144 based on the signal for detecting the BS-SS (S308) and broadcast the BS-SS to a plurality of base stations 142 and 144 at the selected time (S310). If UE 120 receives the identifier of open femto base station 144, then UE 120 may broadcast the BS-SS. The receipt of the BS-SS and the handover from MBS 140 to FBS 144 (S312-S326) may operate in the same manner as steps S214-S228 in FIG. 3.

According to the embodiments of the present invention, it is possible to perform a handover from MBS 140 to FBS 142 or FBS 144 without broadcasting the information for all FBSs 142 and 144 in service area 140*a* of MBS 140 from MBS 140 to UE 120. Furthermore, it is possible to efficiently use radio resources and prevent dissipation of power because MBS 140 may not broadcast the information for all FBSs 142 and 144.

Any reference in this specification to "one embodiment," "an embodiment," "example embodiment," "illustrative embodiment," etc. means that a particular feature, structure or characteristic described in connection with the embodiment is included in at least one embodiment of the present invention. The appearances of such phrases in various places in the specification are not necessarily all referring to the same embodiment. Further, when a particular feature, structure or characteristic is described in connection with any embodiment, it is submitted that it is within the purview of one skilled in the art to affect such feature, structure or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of performing a handover from a serving base station to a target base station within a network that includes a plurality of base stations, wherein a plurality, of target base stations are within a service area of the serving base station, the method comprising:

transmitting, from the serving base station to the user equipment, a signal for detecting a base station searching signal (BS-SS), wherein the user equipment receives the signal for detecting the BS-SS- and the user equipment broadcasts the BS-SS to the plurality of base stations at a select time;

receiving, from a target base station, a request for the signal for detecting the BS-SS, wherein the target base station is one of the plurality of base stations;

transmitting, in response to the serving base station receiving the request, the signal for detecting the BS-SS from the serving base station to the target base station;

selecting, at the user equipment, a time for broadcasting the BS-SS based on the received signal for detecting the BS-SS;

transmitting the BS-SS at the selected time to the plurality of base stations, wherein the transmitted BS-SS includes an identifier of the target base station and ranging information;

periodically detecting, at the target base station, the BS-SS from the user equipment;

calculating, at the target base station, a location of the user equipment based on an intensity of the BS-SS;

determining, at the target base station, whether the target base station may transmit a receipt signal of the BS-SS to the serving base station based on the calculated location of the user equipment;

receiving, at the serving base station, the receipt signal of the BS-SS from the target base station;

identifying, at the serving base station, the user equipment that broadcasted the BS-SS to the plurality of base stations, based on the receipt signal of the BS-SS; and performing a handover from the serving base station to the target base station based on confirmation of the identified user equipment by the serving base station, wherein performing the handover includes performing the handover from the serving base station to the target base station without broadcasting information to all the plurality of target base stations in the service area of the serving base station.

2. The method of claim 1, wherein the BS-SS comprises a ranging signal, which is a standard of WiMAX.

3. The method of claim 1, wherein the target base station is a femto base station that operates as a closed access mode, and the user equipment is registered in the target base station.

4. The method of claim 3, further comprising:
providing, from the serving base station, an identifier of the femto base station to the user equipment.

5. The method of claim 1, wherein the BS-SS is a ranging signal, and the signal for detecting the BS-SS includes cell information of a corresponding macro base station for detecting the ranging signal as recognition information.

6. The method of claim 1, wherein the BS-SS is a ranging signal, and the signal for detecting the BS-SS includes at least one of a code range, a cycle, intensity, back off beginning and ending values of the ranging signal and a ranging region.

7. A communication system capable of performing a handover from a serving base station to a target base station, wherein a plurality of target base stations are within a service area of the serving base station, the communication system comprising:

a serving base station configured to transmit a signal for detecting a base station searching signal (BS-SS) to a user equipment, wherein the user equipment receives the signal for detecting the BS-SS and broadcasts the BS-SS to a plurality of base stations at a select time, wherein the BS-SS is a ranging signal, and a target base station configured to detect the BS-SS from the user equipment, wherein the target base station is one of the plurality of base stations, wherein the target base station transmits a request for the signal for detecting the BS-SS to the serving base station, and the serving base station transmits the signal for detecting the BS-SS to the target base station, wherein the user equipment selects the time for broadcasting the BS-SS based on the received signal for detecting the BS-SS, and the user equipment transmits the BS-SS signal at the selected time to the plurality of base stations, wherein the transmitted BS-SS signal, which is a ranging signal, includes an identifier of the target base station, information of the ranging signal and an intensity of the ranging signal, wherein the target base station periodically detects the BS-SS from the user equipment, wherein the target base station is configured to calculate a location of the user equipment based on an intensity of the BS-SS, to determine whether the target base station is to transmit a receipt signal of the BS-SS to the serving base station based on the calculated location of the user equipment and to transmit the receipt signal of the BS-SS to the serving base station, wherein the target base station identifies the user equipment that broadcasted the BS-SS to the plurality of base stations, based on the receipt signal of the BS-SS, and the serving base station is configured to perform a handover from the serving base station to the target base station based on confirmation of the identified user equipment by the serving base station, wherein the serving base station to perform the handover from the serving base station to the target base station without broadcasting information to all the plurality of target base stations in the service area of the serving base station.

8. The communication system of claim 7, wherein the ranging signal is a standard of WiMAX.

9. The communication system of claim 7, wherein the target base station is a femto base station operated as a closed access mode, and the user equipment is registered in the target base station.

10. The communication system of claim 9, wherein the serving base station provides an identifier of the femto base station to the user equipment.

11. The communication system of claim 7, wherein the signal for detecting the BS-SS includes cell information of a corresponding macro base station for detecting the ranging signal as recognition information.

12. The communication system of claim 7, wherein the signal for detecting the BS-SS includes at least one of a code range, a cycle, intensity, back off beginning and ending values of the ranging signal and a ranging region.

* * * * *